United States Patent
Flick et al.

(10) Patent No.: US 12,078,273 B2
(45) Date of Patent: Sep. 3, 2024

(54) TUBING CONNECTORS

(71) Applicant: Merck Patent GmbH, Darmstadt (DE)

(72) Inventors: Olivier Flick, Molsheim (FR); Robert Langlois, Groton, MA (US); James Vigna, Tyngsborough, MA (US); Christine Crequy, Molsheim (FR); Thomas Coton, Illkirch-Graffenstaden (FR)

(73) Assignee: Merck Patent GmbH, Darmstadt (DE)

( * ) Notice: Subject to any disclaimer, the term of this patent is extended or adjusted under 35 U.S.C. 154(b) by 49 days.

(21) Appl. No.: 17/997,399

(22) PCT Filed: May 17, 2021

(86) PCT No.: PCT/EP2021/062912
§ 371 (c)(1),
(2) Date: Oct. 28, 2022

(87) PCT Pub. No.: WO2021/233798
PCT Pub. Date: Nov. 25, 2021

(65) Prior Publication Data
US 2023/0220933 A1    Jul. 13, 2023

(30) Foreign Application Priority Data
May 20, 2020    (EP) .................................... 20305526

(51) Int. Cl.
*F16L 33/207*    (2006.01)
(52) U.S. Cl.
CPC ............................... *F16L 33/2078* (2013.01)

(58) Field of Classification Search
CPC ... F16L 33/2078; F16L 33/025; F16L 33/035; F16L 33/23; F16L 33/22
USPC .................................. 285/252, 253, 254
See application file for complete search history.

(56) References Cited

U.S. PATENT DOCUMENTS

| | | | | |
|---|---|---|---|---|
| 1,212,817 A | * | 1/1917 | Russell | F16L 33/00 285/280 |
| 1,745,295 A | * | 1/1930 | Greve | F16L 33/23 285/259 |
| 1,879,565 A | * | 9/1932 | Smith | F16L 33/23 285/253 |
| 4,135,744 A | * | 1/1979 | Fouts | F16L 33/08 285/253 |

(Continued)

FOREIGN PATENT DOCUMENTS

| | | |
|---|---|---|
| JP | S61-66287 U | 5/1986 |
| JP | 2001-193881 A | 7/2001 |

(Continued)

OTHER PUBLICATIONS

International Search Report and Written Opinion received for PCT Application No. PCT/EP2021/062912, mailed on Oct. 14, 2021, 9 Pages.

(Continued)

*Primary Examiner* — David Bochna
(74) *Attorney, Agent, or Firm* — Merck Patent GmbH

(57) ABSTRACT

The disclosure herein relates to a flow path comprising half clamps 1 having an interior surface surrounding a flexible tubing 3 connection with a barb adapter 3, when assembled may be placed within a clamshell reduce or prevent deformation of the flexible tubing.

18 Claims, 4 Drawing Sheets

(56) References Cited

U.S. PATENT DOCUMENTS

| | | | |
|---|---|---|---|
| 4,150,848 A | | 4/1979 | Dyrup |
| 4,607,867 A | * | 8/1986 | Jansen .................... F16L 31/00 |
| | | | 285/259 |
| 4,758,029 A | * | 7/1988 | Davis ...................... F16L 33/23 |
| | | | 285/259 |
| 6,371,154 B1 | * | 4/2002 | Kesterman .............. F16L 33/22 |
| | | | 285/903 |
| 9,273,811 B1 | | 3/2016 | Webber |
| 2015/0137509 A1 | | 5/2015 | Desjardins et al. |
| 2016/0146386 A1 | | 5/2016 | Blake et al. |
| 2016/0186906 A1 | * | 6/2016 | Blake .................... F16L 33/025 |
| | | | 285/319 |
| 2018/0340639 A1 | * | 11/2018 | Requate ................ F16L 33/025 |

FOREIGN PATENT DOCUMENTS

| | | |
|---|---|---|
| JP | 2011-102606 A | 5/2011 |
| WO | 2021/233798 A1 | 11/2021 |

OTHER PUBLICATIONS

Office Action received for Japanese Patent Application No. 2022-570540 mailing date Feb. 20, 2024, 12 Pages (5 Pages of English Translation & 7 Pages of Official Copy).

* cited by examiner

TUBING CONNECTORS

CROSS-REFERENCE TO RELATED APPLICATIONS

The present application is the US National Stage of International Application No. PCT/EP2021/062912, filed May 17, 2021, which claims the benefit of priority of EP Priority Application No. 20305526.4, filed May 20, 2020, the entire contents of which both applications are incorporated herein by reference.

RELEVANT FIELD

Embodiments disclosed herein relate to connectors. More specifically, embodiments described herein relate to a clamp system having two half clamps for connection of flexible tubing with a barb adapter, also referred to as a barb fitting. In some embodiments, the half clamps are held in place with at least one ear clamp and placed in a clamshell-style holder, referred to herein as a clamshell.

BACKGROUND

Single-use systems (SUSs) have become an important asset in the development and scale up of biotechnology processes. While the SUSs presently used in the art increase flexibility in manufacturing and reduce cleaning costs in development and change over, the connections with flexible tubing in these systems can struggle with withstanding high-pressure operations. SUSs assemblies are most commonly made of polymeric materials. The pressure tolerance of the plastic components, such as the flexible tubing of SUSs, is generally lower than the pressure tolerance of traditional stainless-steel piping systems.

Currently, cable ties, hose clamps, or barb clamps are commonly used in the art to provide a secure connection to flexible tubing. These means of connection have been observed in certain conditions to have poor pull off strength and provide an inherent leak path. Secure and leak-proof connections are especially important in the medical and pharmaceutical fields, for example, luer fittings, quick connects, and sanitary fittings, such as those used in blood pumps, oxygen concentrators, sleep apnea equipment, medical transport containers, and IV bags.

In a flow path made of a low-hardness silicone tubing manifold, the tubing has been observed to expand out of the clamshell when subjected to pressure above two bars, leading to tubing deformation and potential leaking. For example, when subjected to four bars pressure, silicone tubing has been observed to expand outside a clamshell on all external interfaces. Expansion was also observed on the barb adapters at least partially inserted inside the tubing for external connections.

Systems offering unique single-use flow paths housed in a hardware clamshell allowing the film or tubing flow path to withstand high pressure application up to or greater than four bars represent an inventive advance in the art.

SUMMARY

The shortcomings of the prior art are overcome by embodiments described herein, which include some embodiments disclosed herein, which provide a flow path with a leak resistant connection and half clamps to reduce or prevent tube expansion and/or deformation. Further, in some embodiments, the flow path described herein is adapted for high pressure applications exceeding the pressure rating for each component of the flow path individually.

Some embodiments described herein provide a flow path comprising: at least one flexible tube; a barb adaptor inserted into the interior cavity of the at least one flexible tube to form a connection between the at least one flexible tube to an inlet or an outlet; two semi-circular half clamps encircling the exterior of the connection; a plurality of teeth on the interior surface of the half clamps; a locating groove on the interior surface of the half clamps; at least one ear clamp securing the half clamps around the connection; and a sealing edge on the interior of the half clamps to radially compress the exterior surface of the at least one flexible tube.

In some embodiments, the two half clamps of the flow path are identical. In some embodiments, the at least one ear clamp is within a recess on an exterior surface of the half clamps. In some embodiments of the flow path, the at least one ear clamp is made of a metal, for e.g., stainless steel. In some embodiments, the flow path further comprises a clamshell interfacing with at least a portion of the exterior surface of the half clamps. In some embodiments, the exterior surfaces of the half clamps have a locating rib capable of fitting within a groove in the interior surface of the clamshell. In some embodiments, a protrusion on the ear clamp fits within a groove in the interior surface of the clamshell. In some embodiments, the interior surface of the clamshell comprises more than one groove. In some embodiments, the at least one ear clamp is within the more than one groove. In some embodiments, the at least one of the flexible tube, the barb adapter, and the half clamps are made of a polymeric material.

In some embodiments, the inlet and/or the outlet is selected from a flexible tube or a port of a biocontainer. In some embodiments, the flexible tube is low hardness silicone tubing. In some embodiments, two ear clamps secure the half clamps around the connection. In some embodiments, three, four, five, six, seven, eight, nine, or ten ear clamps secure the half clamps around the connection.

Some embodiments described herein provide a method of increasing the pressure tolerance of a piping system, the method comprising: inserting a barb adapter into a flexible tube; sliding at least one ear clamp over the flexible tube; positioning the half clamps on the barb adapter and the flexible tube by matching the locating grooves on the interior of the half clamps to protrusions of the barb adapter to encircle the barb adapter and the flexible tube with the half clamps; compressing the tubing with a sealing edge on the interior of the half clamps by tightening the ear clamp at recesses on the exterior surface of the half clamps; and securing the half clamps into a clamshell by inserting a locating rib of the half clamps into a groove on an interior surface of the clamshell, thereby increasing the tolerance of the piping system.

In some embodiments, the method increases the pressure tolerance to more than four bars. In some embodiments of the method, the pressure tolerance is increased more than two bars. In some embodiments of the method, the pressure tolerance is increased by less than four bars. In some embodiments of the method, the pressure tolerance is increased to the pressure tolerance of a stainless steel piping system. In some embodiments, the method further comprises inserting the at least one ear clamp into an additional groove on the interior surface of the clamshell.

Figure 1A:
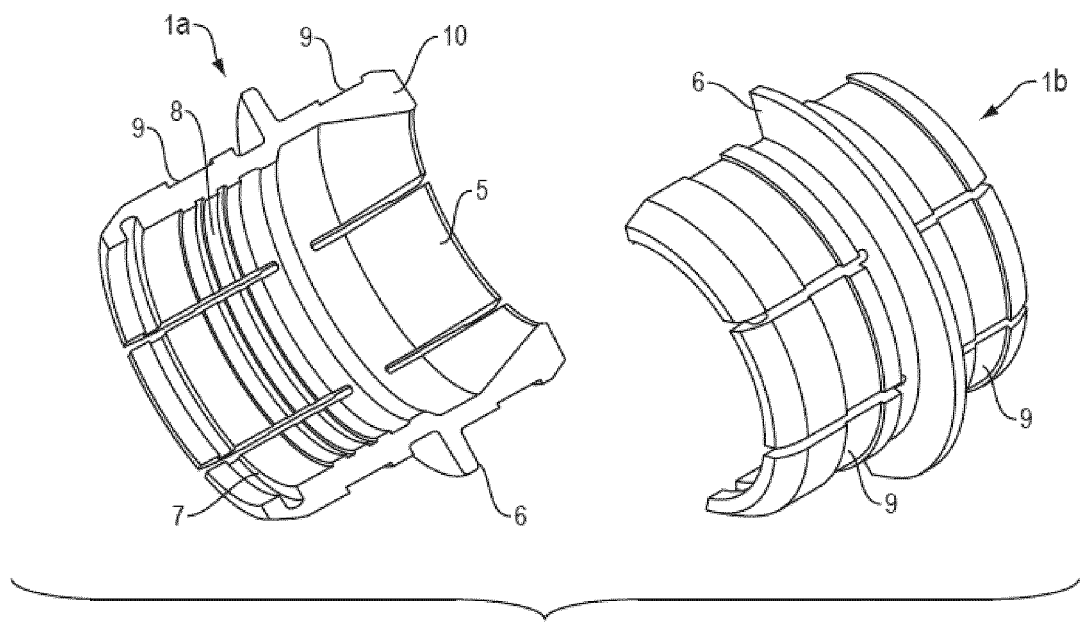
FIG. 1A provides an exploded view of some embodiments of the half clamps.

The appended drawings illustrate some embodiments of the disclosure herein and are therefore not to be considered limiting in scope, for the invention may admit to other equally effective embodiments. It is to be understood that elements and features of any embodiment may be found in other embodiments without further recitation and that, where possible, identical reference numerals have been used to indicate comparable elements that are common to the figures.

DETAILED DESCRIPTION

The disclosure herein describes some embodiments of a flow path comprising half clamps having an interior surface surrounding a flexible tubing connection with a barb adapter. In some embodiments, the flexible tubing is connected to a source of a gaseous fluid, source of a liquid fluid, delivery site of a fluid, or additional flexible tubing allowing the gaseous fluid or the liquid fluid to flow through the flexible tubing. Alternatively, in some embodiments, the flexible tubing is transporting a gaseous fluid or liquid fluid into a biocontainer.

Figure 1B:
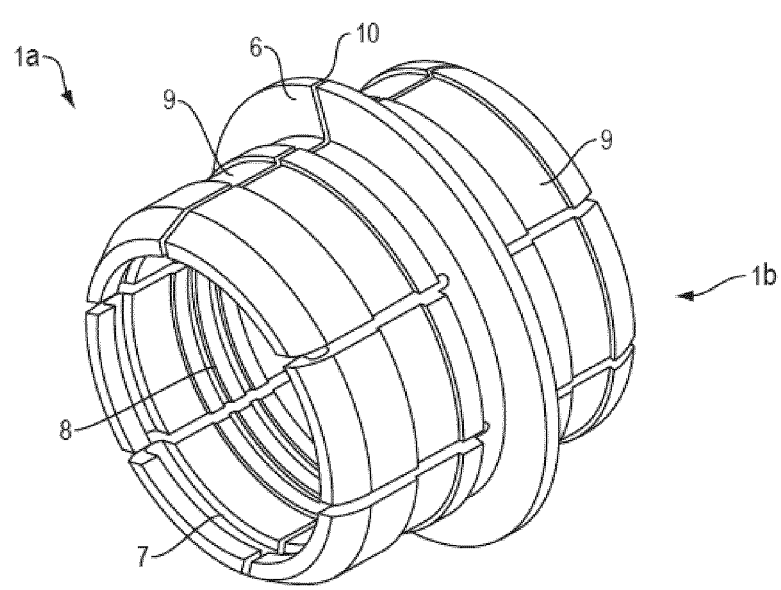
FIG. 1B provides a view of some embodiments of an assembled set of half clamps.
Figure 2A:
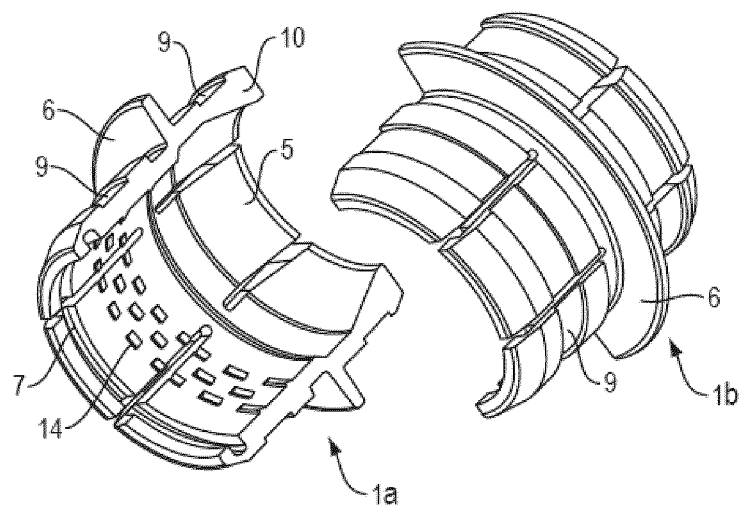
FIG. 2A provides an exploded view of some embodiments of the half clamps.
Figure 2B:
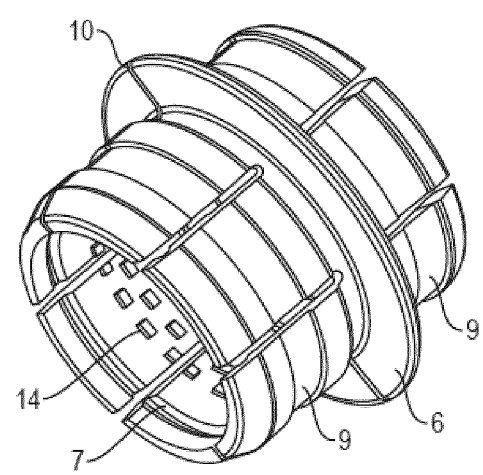
FIG. 2B provides a view of some embodiments of an assembled set of half clamps.

Turning now to the figures, FIG. 1A and FIG. 2A provide exploded views of some embodiments of the half clamps 1a, 1b. FIG. 1B and FIG. 2B provide a view of some embodiments of an assembled set of half clamps 1a, 1b. As shown in FIG. 1A, FIG. 1B, FIG. 2A, and FIG. 2B, in some embodiments, a flow path minimizing tubing expansion and/or deformation comprises two half clamps 1 (separately designated as 1a and 1b). In some embodiments, the two half clamps 1 are identical. In some embodiments, the half clamps 1 are held together by an external force or device, such as at least one ear clamp 4 (see, FIG. 3 and FIG. 4). Alternatively, in some embodiments, one of the half clamps 1a comprises a male component and one of the half clamps 1b comprises a female component, wherein the female component fits within the male component to secure the half clamps 1 together. In some embodiments, the male component and the female component interlock to couple the half clamps 1 together at a contact surface 10. Alternatively, in some embodiments, the two half clamps 1 are connected by a hinge (not shown).

In some embodiments, the half clamps 1 prevent tubing deformation, when flexible tubing 3 is subjected to high pressure up to four bars by forming a securing and supporting 'shell' around the exterior surface of the tubing 3. In some embodiments, the half clamps 1 provide a complete radial seal around the exterior surface of the flexible tubing 3. In some embodiments, the complete radial seal is achieved by using a sealing edge 5 on the interior surface of the half clamps 1 to compress the tubing as a stainless-steel ear clamp 4 is closed. In some embodiments, tubing 3 expansion is prevented by a locating rib 6 on the exterior surface of the half clamps 1 situated within an interior groove 13 on an interior surface a clamshell-style holder 12. In some embodiments, a locating groove 7 and friction ribs 8 on the interior surface of the half clamps 1 also help reduce tubing displacement. In some embodiments, the friction ribs 8 do not span the entire circumference of the interior surface of the half clamps 1. In some embodiments, a locating groove 7 and teeth 14 on the interior surface of the half clamps 1 also help reduce tubing displacement. In some embodiments, the exterior surface of the half clamps 1 have dedicated recesses 9 to position the ear clamps 4 during assembly of the flow path.

Figure 3:
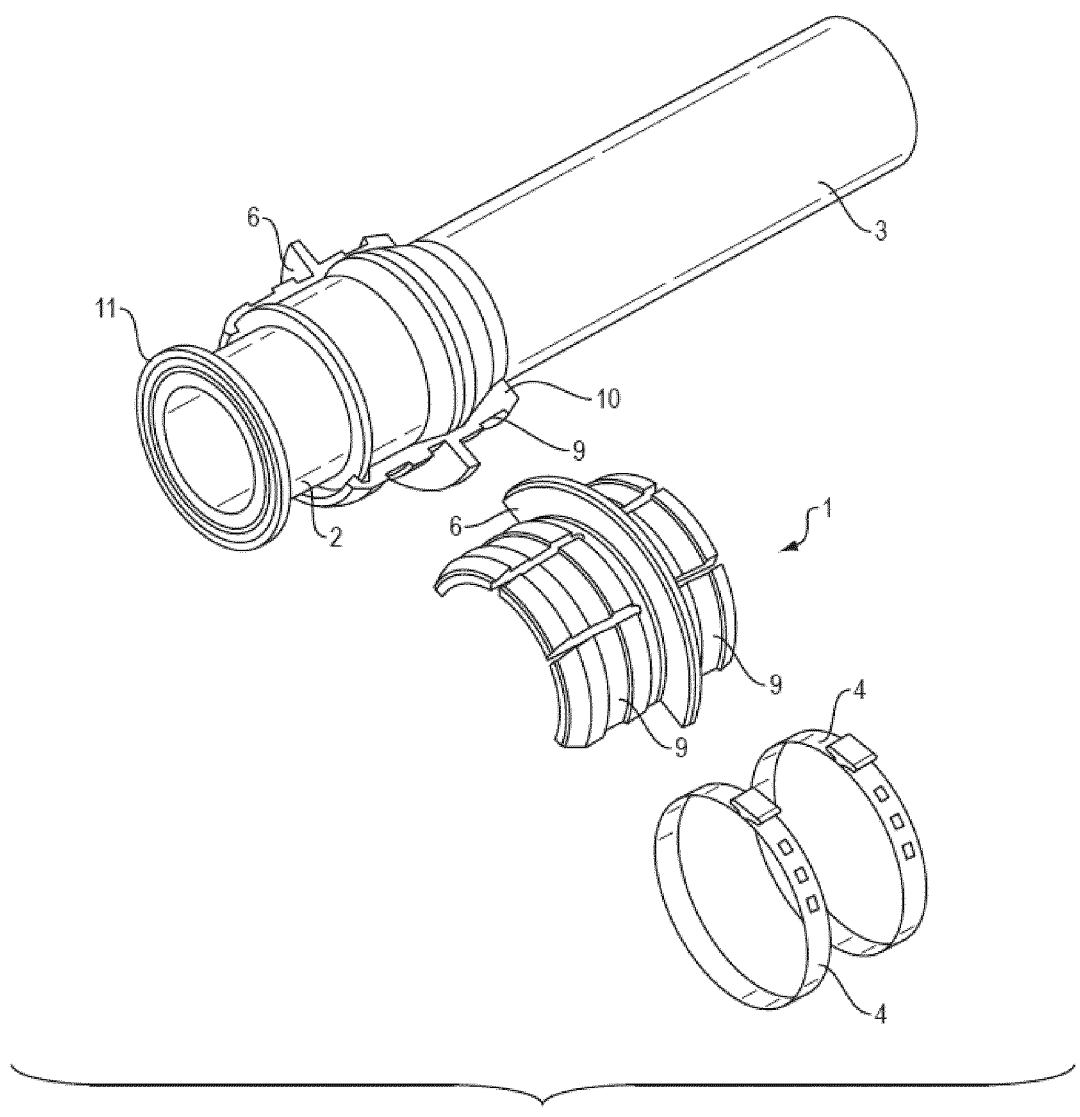
FIG. 3 provides an exploded view of some embodiments of a flow path.

As shown in FIG. 3, in some embodiments, the barb adapter 2 comprises at least one expanded end 11. In some embodiments, the expanded end 11 is a tri-clamp (TC) connection. In some embodiments, the TC connection is connected to other TC ends. In some embodiments, a conical end of the barb adapter 2 is inserted into an opening of flexible tubing 3 to contact the interior surface of the flexible tubing 3. In some embodiments, at least a portion of the barb adapter 2 remains protruding from the flexible tubing 3. In some embodiments, contact of the conical end of the barb adapter 2 with the interior surface of the flexible tubing 3 forces fluid through an opening of the barb adapter 2 and prevents fluid from flowing around the peripheral edge of the barb adapter 2. For example, at least a portion of the barb adapter 2 may have an exterior surface with a circumference the same or greater than the circumference of the interior surface of the flexible tubing 3 to facilitate contact, e.g. a snug connection, between the barb adapter 2 and the flexible tubing 3. In some embodiments, the circumference of the barb adapter 2 is up to 10% greater than the circumference of the interior surface of flexible tubing 3. In some embodiments, the contact of the barb adapter 2 with the interior surface of the flexible tubing 3 spans the entire circumference of the interior surface of the flexible tubing 3. In some embodiments, the contact of the barb adapter 2 with the interior surface of the flexible tubing 3 spans the entire circumference of the exterior surface of the barb adapter 2.

In some embodiments, the barb adapter 2 comprises a metal material. In some embodiments, the barb adapter 2 comprises a non-metal material. In some embodiments, the non-metal material is weldable. For example, the non-metal material may be heat welded to a propylene or ethylene bag, such as a disposable biocontainer. In some embodiments, the non-metal material is selected from U.S. Food and Drug Administration (FDA) approved polypropylene, silicon, thermoplastic elastomers (TPE), and thermoplastic rubber (TPR). In some embodiments, the metal material is a non-corrosive material, for example, brass. In some embodiments, the non-metal material is polyethylene. In some embodiments, welding techniques can be selected from the group consisting of plastic welding or heat sealing, for example, ultrasonic welding, laser welding, welding using infra-red radiation, or thermal welding.

In some embodiments, the half clamps 1 are held in place with at least one ear clamp 4. In some embodiments, the half clamps 1 are held in place with two ear clamps 4. In some embodiments, the half clamps 1 are held in place with more than two ear clamps 4. For example, some embodiments may comprise three, four, five, six, seven, eight, nine, or ten ear clamps 4. In some embodiments, the at least one ear clamp 4 is made of a material selected from stainless steel or plastic.

Figure 4:
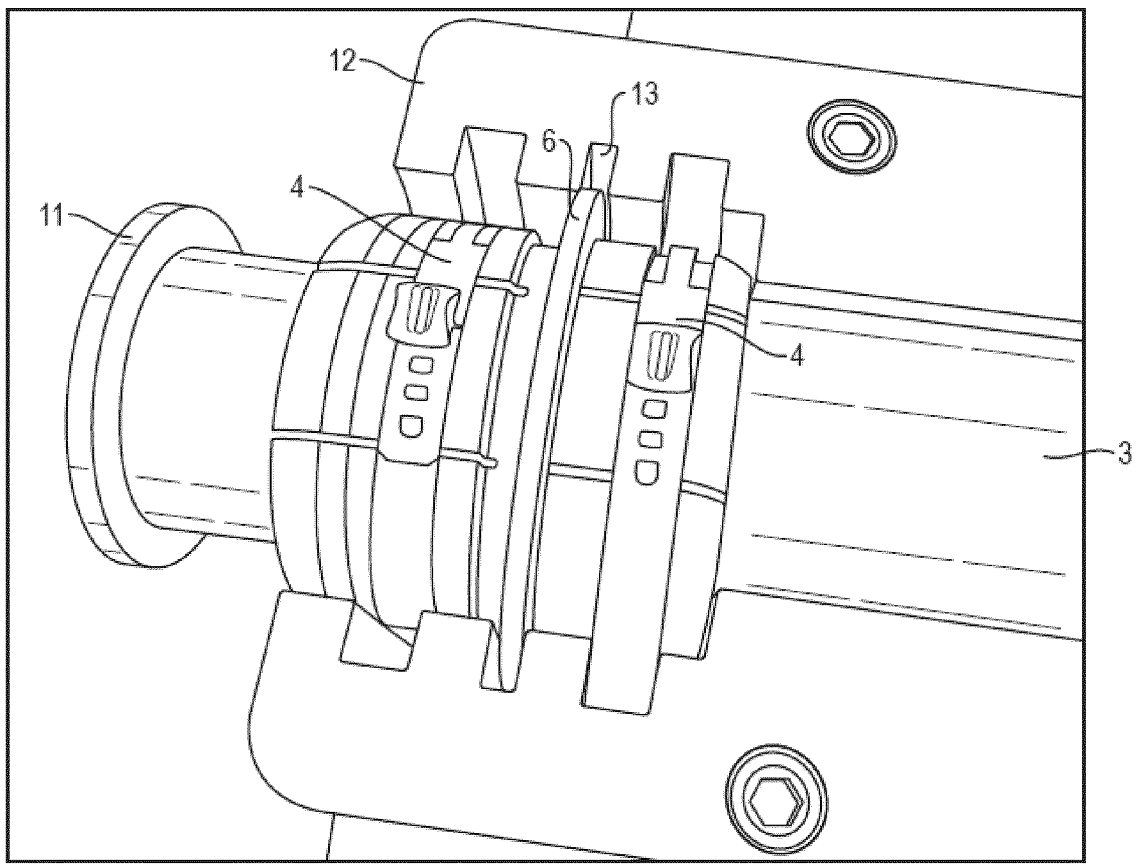
FIG. 4 provides a view of some embodiments of a fully assembled flow path.

As shown in FIG. 4, in some embodiments, an assembly of the half clamps 1 surrounding the circumference of the exterior surface of flexible tubing 3, e.g., low hardness silicone similar in hardness to DOW CORNING® Pharma-50 tubing, was integrated into a clamshell 12 to withstand maximal pressure of four bars and to prevent expansion of the flexible tubing 3. In some embodiments, the half clamps 1 surround the exterior surface of a flexible tube 3 with a barb adapter 2. In some embodiments, the half clamps 1 contact one another to surround at least a portion of the exterior surface of the flexible tubing 3 having a barb adapter 2 contacting the interior surface of the flexible tubing 3.

Some embodiments described herein allow the flow path to withstand pressure conditions above the specified pressure rating of the flexible tubing 3 alone and to prevent tubing deformation. In some embodiments, the half clamps 1 reduce or prevent leaking of fluid at the tubing connection. A secure and leak-proof connections of flexible tubing 3 is important in medical, pharmaceutical, automotive, industrial, and bioprocessing fields. In some embodiments, liquid is not trapped in the connections and does not cause, for example, bacterial growth.

I. Assembly

In some embodiments, the flow path is assembled by inserting the barb adapter 2 into an opening of the tubing 3. In some embodiments, the two half clamps 1 are placed around the exterior surface of the flexible tubing 3 with an inserted barb adapter 2, using the locating groove 7 and teeth 14 on the interior surface of the half clamps 1 to position the half clamps 1 based on at least one feature the exterior surface of the barb adapter 2. In some embodiments, the two half clamps 1 form a shell around the barb adapter 2 inserted into a cavity of the flexible tubing 3. In some embodiments, the half clamps 1 can only be assembled around the barb adapter 2 inserted into flexible tubing 3 in one direction. In some embodiments, at least two ear clamps 4 are placed over the half clamps 1 and integrated into the dedicated recesses 9 on the exterior surface of the half clamps 1. In some embodiments, the ear clamps 4 are tightened over the half clamps 1. In some embodiments, the flexible tubing 3, barb adapter 2, and half clamps 1 assembly is placed in a clamshell 12. In some embodiments, the tubing has an internal diameter (ID) within the range of about ⅛" (0.125") to about 1¼" (1.25"). In some embodiments, the ID is about 1¼" (1.25"). In some embodiments, the ID is about 1". In some embodiments, the ID is about ¾" (0.75"). In some embodiments, the ID is about ⅝" (0.625"). In some embodiments, the ID is about ½" (0.5").

II. Definitions

Unless defined otherwise, all technical and scientific terms used herein have the same meaning as commonly understood by one of ordinary skill in the art to which this invention pertains.

The term, "barb fitting," as used herein, refers to a connecting device for tubing, which allows a fluid to pass through and has a radial protrusion to reduce or prevent leaking in the connection.

The term, "biocontainer," as used herein, refers to any manufactured or engineered device or system that supports a biologically active environment.

The term, "fluid," as used herein, refers to a material with particles that easily move and change their relative position without a separation of the mass and that easily yield to pressure.

The term, "inlet," as used herein, refers to a connection transporting a fluid toward a biocontainer.

The term, "outlet," as used herein, refers to a connection transporting a fluid away from a biocontainer.

The term, "pressure tolerance," as used herein, refers to a resistance to expansion and/or deformation, specifically of the flexible tubing.

As used herein, the singular forms "a", "an," and "the" include plural unless the context clearly dictates otherwise.

EQUIVALENTS

All ranges for formulations recited herein include ranges therebetween and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4, or 3.1 or more.

Reference throughout this specification to "one embodiment," "certain embodiments," "one or more embodiments," "some embodiments," or "an embodiment" indicates that a feature, structure, material, or characteristic described is included some embodiments of the disclosure. Therefore, the appearances of the phrases such as "in one or more embodiments," "in certain embodiments," "in one embodiment," "some embodiments," or "in an embodiment" throughout this specification are not necessarily referring to the same embodiment.

Publications of patent applications and patents and other non-patent references, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

What is claimed is:

1. A flow path comprising:
    at least one flexible tube;
    a barb adapter inserted into an interior cavity of the at least one flexible tube to form a connection between the at least one flexible tube to an inlet or an outlet;
    two semi-circular half clamps encircling an exterior of the connection;
    a plurality of teeth on an interior surface of the half clamps;
    a locating groove on the interior surface of the half clamps;
    at least one ear clamp securing the half clamps around the connection; and
    a sealing edge on the interior of the half clamps to radially compress an exterior surface of the at least one flexible tube.

2. The flow path of claim 1, wherein the two half clamps are identical.

3. The flow path of claim 1, wherein the at least one ear clamp is within a recess on an exterior surface of the half clamps.

4. The flow path of claim 1, wherein the at least one ear clamp is made of stainless steel.

5. The flow path of claim 1, further comprising a clamshell interfacing with at least a portion of the exterior surface of the half clamps.

6. The flow path of claim 5, wherein the half clamps have a locating rib capable of fitting within a groove in the interior surface of the clamshell.

7. The flow path of claim 6, wherein the interior surface of the clamshell comprises a plurality of grooves.

8. The flow path of claim 6, wherein the at least one ear clamp is a plurality of ear clamps, and the plurality of ear clamps are disposed within the plurality of grooves.

9. The flow path of claim 1, wherein the at least one flexible tube, the barb adapter, and the half clamps are made of a polymeric material.

10. The flow path of claim 1, wherein the inlet or the outlet is selected from a flexible tube or a port of a biocontainer.

11. The flow path of claim 1, wherein the at least one flexible tube is low hardness silicone tubing.

12. The flow path of claim 1, wherein the at least one ear clamp is two ear clamps that secure the half clamps around the connection.

13. The flow path of claim 1, wherein the at least one ear clamp is a plurality of ear clamps that secure the half clamps around the connection.

14. A method of increasing a pressure tolerance of a piping system, the method comprising:
   inserting a barb adapter into a flexible tube;
   sliding at least one ear clamp over the flexible tube;
   positioning half clamps on the barb adapter and the flexible tube by matching locating grooves on an interior of the half clamps to protrusions of the barb adapter to encircle the barb adapter and the flexible tube with the half clamps; and
   compressing the flexible tube with a sealing edge on the interior of the half clamps by tightening the at least one ear clamp at recesses on an exterior surface of the half clamps.

15. The method of claim 14, further comprising securing the half clamps into a clamshell by inserting a locating rib of the half clamps into a groove on an interior surface of the clamshell, thereby increasing the pressure tolerance of the piping system.

16. The method of claim 15, further comprising inserting the at least one ear clamp into an additional groove on the interior surface of the clamshell.

17. The method of claim 14, wherein the method causes the pressure tolerance of the piping system to be greater than four bar.

18. The method of claim 14, wherein the method causes the pressure tolerance of the piping system to increase more than two bar from an initial pre-method pressure tolerance of the piping system.

* * * * *